United States Patent [19]

Huntt

[11] 4,172,318
[45] * Oct. 30, 1979

[54] METHOD OF JOINING MANGANESE ZINC FERRITE POLE PIECES

[76] Inventor: Robert L. Huntt, 25007 Woodfield Rd., Damascus, Md. 20750

[ * ] Notice: The portion of the term of this patent subsequent to Sep. 20, 1994, has been disclaimed.

[21] Appl. No.: 825,425

[22] Filed: Aug. 17, 1977

[51] Int. Cl.² ............................................. G11B 5/42
[52] U.S. Cl. ...................................... 29/603; 360/120
[58] Field of Search ................. 29/603; 360/119, 120, 360/121

[56] References Cited

U.S. PATENT DOCUMENTS

| | | | |
|---|---|---|---|
| 3,104,455 | 9/1963 | Frost | 29/603 |
| 3,672,045 | 6/1972 | Robertson | 29/603 |
| 3,795,954 | 3/1974 | Alex et al. | 29/603 |
| 4,048,714 | 9/1977 | Huntt | 29/603 |

*Primary Examiner*—Carl E. Hall
*Attorney, Agent, or Firm*—Murray & Whisenhunt

[57] ABSTRACT

A method of joining two manganese zinc ferrite pole pieces, to form a product suitable for use in radio frequency recording apparatus, and especially for multi-core magnetic heads, is disclosed. Chromium layers are formed on each manganese zinc ferrite pole piece, on opposed faces thereof, and then the chromium layers are bonded together by means of a suitable adhesive, such as a high strength epoxy adhesive.

7 Claims, 2 Drawing Figures

METHOD OF JOINING MANGANESE ZINC FERRITE POLE PIECES

BACKGROUND OF THE INVENTION

My U.S. Pat. No. 3,789,505 of Dec. 5, 1974 discloses a multi-core magnetic head of non-magnetic and magnetic ceramic material, especially ferrite material. The magnetic ferrite material is glass bonded to the non-magnetic ferrite material. The disclosure of my earlier patent is hereby incorporated by reference.

U.S. Pat. No. 3,024,318 to Duinker et al discloses the use of a glass gap spacer for magnetic heads.

The prior art has been unable to utilize the properties of manganese-zinc ferrite material as the magnetic ceramic of such magnetic heads, as the manganese-zinc ferrite has an affinity for oxygen and reacts with air as well as with the glass bonding composition. The reaction between the glass and the ferrite produces stresses in the ferrite, which have resulted in mechanical defects in the ferrite.

The technique of glass bonding ferrite materials for recording head applications has long been an accepted method in the prior art for producing gaps in magnetic materials, with the gaps generally ranging from 10–250 microinches in width; and occasionally as great as 500 microinches in width. However, the heads produced by the conventional glass bonding technique have used nickel-zinc ferrite materials and not manganese-zinc ferrite materials, because of the above manganese-zinc ferrite reaction problem. The glass actually appears to etch away the surface of manganese-zinc ferrite, and the glass may migrate into the boundaries of the ferrite.

Various techniques can occasionally result in glass bonded manganese-zinc ferrites with reduced reaction between the glass and the manganese-zinc ferrite. Such techniques include, for instance, the use of a vacuum in the glass bonding step. However, the prior art has never been able to eliminate the reaction between the glass and the manganese-zinc ferrite.

The Treptow U.S. Pat. No. 3,029,559 discloses a method of bonding glass to metal surfaces using an interface layer of various finely-divided metals, including nickel, iron, cobalt, platinum, molybdenum, tungsten, copper, silver and gold. These metals are applied to the substrate surface in the form of powders, and sintered in a non-oxidizing or reducing atmosphere. The amount of intermediate layer applied is insufficient to form an integral film, and the patentee desires to form a joint bonding of the glass to both the substrate and the metal sintered thereon (note column 3, first full paragraph).

The Rohrer U.S. Pat. No. 3,404,968 is directed to solving problems of metal embrittlement and disintegration by oxidation associated with the manufacture of glass-to-metal seals. The patentee forms a first intermediate layer of nickel and chromium above a metal substrate, and then forms a second layer of chromium oxide, preferably by oxidizing chromium in the first layer. The glass is then bonded to the chromium oxide layer.

My co-pending patent application Ser. No. 697,842, filed June 21, 1976, now U.S. Pat. No. 4,048,714, discloses a method of minimizing reactions between a surface of manganese zinc ferrite and a glass bonding compositions applied thereto, while minimizing oxidation of the manganese in the ferrite, by forming an intermediate barrier layer on the manganese zinc ferrite surface prior to the application of the glass bonding composition. The glass bonding composition is preferably a high lead glass bonding composition, which can be fired at a temperature below 700° C., preferably below 500° C.

The assembly of my aforesaid U.S. patent application Ser. No. 697,842 produces magnetic recording/reproducing heads which have improved wear resistance, as compared to heads having substantial gaps of glass bonding composition, such as U.S. Pat. No. 3,795,954, Alex et al.

SUMMARY OF THE INVENTION

The present invention is directed to a process for preparing a magnetic recording/reproducing head having extremely good wear characteristics. The head is formed of two manganese zinc ferrite pole pieces, with at least 90% of the gap between the pole pieces occupied by layers of chromium. The chromium layers are formed on the manganese zinc ferrite pole pieces, and then the two chromium layers are jointed together by means of a high strength adhesive, such as a high strength epoxy resin, having a thickness which is less than 10% of the gap width, and preferably less than 5% of the gap width.

In other applications, a magnetic head may include a block of non-magnetic ceramic material and pieces of shaped manganese zinc ferrite material, which are bonded together by forming chromium layers thereon, followed by joining the chromium layers by means of a thin layer of a high strength synthetic resin or other adhesive.

DESCRIPTION OF THE INVENTION

The present invention is useful in the production of record heads of manganese zinc ferrite material, in applications for radio frequency recordings. Such applications include flying heads, and both contact and non-contact mode record heads. A very suitable type of record head is disclosed in my aforesaid U.S. Pat. No. 3,789,505. The record head will comprise a series of magnetic pole pieces with gaps between the pole pieces.

The layer of chromium or other metal is generally from 45 to 49.9% of the width of the glass, with the two layers of chromium of approximately equal width. However, it will be readily appreciated that in some situations asymmetrical configuration may be used, wherein one of the chromium layers is considerably thinner than the other. The important thing, however, is to substantially, completely fill the gap between the manganese zinc ferrite pole pieces with chromium or other metal, so that the amount of high strength adhesive which is exposed to wear conditions is a very small percentage of the total gap thickness. It is especially preferred that this thickness of the adhesive be no more than 2% of the total gap thickness.

Chromium is the definitely preferred material to occupy the substantially all of the space in the gap between the pole pieces. However, other metals can be used, which should have the following characteristics:

a. the metal should be substantially para-magnetic;

b. the metal should exhibit good adhesion to the ferrite surface and to the high strength adhesive; and c. the metal should have a coefficient of thermal expansion reasonably close to that of the manganese zinc ferrite (which is about 10.0–11.0).

Other metals which will form suitable layers, but do not have the overall balance of properties that is exhibited by chromium, can be determined from consideration of the above required characteristics. In some instances it may be permissible to use one of these other metals, including metals of Group IBV, VB, VIB, or VIII of the Mendeleef Periodic Table, except iron, and also tin, aluminum, magnesium, barium and beryllium. The preferred materials of this group of metals are zirconium (or zirconia, zirconium oxide), platinum, molybdenum and titanium. Examples of Group IVB metals are titanium and zirconium. Vanadium is an example of a group VB metal, but because of the known tendency of vanadium to oxidize, an inert atmosphere should be utilized. Examples of Group VIB metals are molybdenum and tungsten, and examples of Group VIII metals include platinum, nickel and rhodium. As iron is magnetic, it is unsuitable for use in the present invention.

In addition to radio frequency sputtering, or R.F. sputtering, various other methods of forming the chromium layer may be utilized. For instance, D.C. sputtering or vapor deposition techniques may be utilized. However, poor adherence of the chromium layer to the ferrite surface has been noted with these other techniques, and therefore the R.F. sputtering technique is greatly preferred. The R.F. sputtering technique is a conventional method of applying a layer of coating of one material on another, and is generally conducted at a temperature around ambient temperature, with water cooling of the apparatus being utilized because of exothermic heat generation. The R.F. sputtering step is not temperature dependent, so that the particular temperature chosen is not critical.

The atmosphere in which the R.F. sputtering is conducted is an inert atmosphere, such as argon, helium, nitrogen, etc. These atmospheres are conventional for R.F. sputtering processes.

Generally around 2000 watts of radio frequency power will be utilized in the R.F. sputtering step, although this can vary widely, e.g., from 500 or less watts to 5000 or more watts. The time required to form the desired thickness of sputtered material will vary according to a number of process parameters, as known to the art, and may range, for instance, from 15 minutes to 5 hours.

The total gap between magnetic manganese zinc ferrite pieces will generally be from 10-500 microinches, and generally from 40-200 microinches. It has been found preferably to have a symmetrical structure in such gap for better wear characteristics, and thus it has been preferred to have a gap filled with layers of chromium which are of approximately equal thickness. Chromium has better wear characteristics than glass, and thus a gap substantially completely filled with chromium, having a high strength adhesive width of no more than 10%, and preferably less than 5%, of the gap width has substantially better wear resistance than the structure disclosed in my application Ser. No. 697,842, using layers of chromium-glass-chromium, all of approximately equal thickness. The adhesive layer will normally have a thickness of at least one microinch and preferably is maintained at about the minimum thickness consistant with obtaining a good adhesive bond to the chromium on each side thereof. Generally, the adhesive thickness will be less than 10 microinches, preferably less than 5 microinches.

The improvement of the present invention is most significant when used with manganese zinc ferrite pole pieces, as the most decided improvement in wear characteristics will normally be then noted. However, it is also possible to use the chromium layers of the present invention, bonded together with the aforesaid high strength adhesive layer, with nickel zinc ferrite pole pieces, whereby the resulting head assembly exhibits improvements in wear characteristics. However, the nickel zince ferrite pole pieces manufactured by the prior art have generally involved high strength high wear resistance glass bonding compositions, so that in some instances the improvement in wear characteristics of the resulting recording/reproducing head obtained by the present invention may not be as markedly significant.

Manganese zinc ferrite compositions are well known to the art. Typically, such materials may have the following composition:

MnO: 15-47 mol %
ZnO: 5-25 mol %
$Fe_2O_3$: 48-55 mol %

Preferably the ferrite material will be hot pressed, although other methods of producing the ferrite shaped article may be utilized.

The high strength adhesive is preferably an epoxy resin, such as one of the well known class of epoxy resins sold under the trademark "EPON" by Shell Oil Company. Typical examples are EPON 1004 and 1007. However, any of the epoxy adhesives discloses in the book entitled "Epoxy Resins", Reinhold Publishing, the disclosure of which is hereby incorporated by reference, may be utilized. Further examples of suitable epoxy resins will be found in Kirk Othmer, Second Edition, the disclosure of which is also incorporated herein by reference.

The epoxy resin is suitably cured at the recommended curing temperatures therefore, normally at temperatures in the range of 250°-350° F. The curing temperature will depend to some extent upon the chemical nature of the particular epoxy resins choosen, and upon the catalyst system utilized for the resin. However, the selection of a proper curing temperature for the epoxy resin is well within the skill of those in the art.

In addition to the epoxy resins, any other suitable thermosetting adhesive may be utilized. For example, polysulfide adhesives, polyurethane adhesives, and the like may be utilized, but in general are not as effective as the epoxy resins, which are greatly preferred.

DESCRIPTION OF THE DRAWINGS

The present invention will be understood more readily with reference to the accompanying drawings, wherein:

In FIG. 1, a portion of a manganese zinc ferrite recording/reproducing head 1 includes a pair of manganese zinc ferrite pole pieces 2, 3 having a gap 4 which is filled by chromium layers 5, 6 and high strength adhesive layer 7. The pole pieces may be part of an assembly in accordance with my aforesaid U.S. Pat. No. 3,789,505, my co-pending patent application Ser. No. 382,604, the disclosure of which is hereby incorporated by reference, or in accordance with U.S. Pat. No. 3,495,045.

Figure 1:
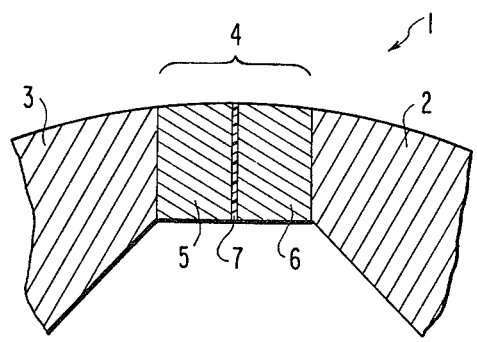
FIG. 1 represents a cross sectional view of the pole pieces and gap of a magnetic recording/reproducing head produced using the process of the present invention.

Chromium layer 5 is R.F. sputtered on pole piece 3, and chromium layer 6 is R.F. sputtered on pole piece 2, before the pole pieces are assembled in operating relationship. After the pole pieces are assembled in the proper relationship, they are cemented together by the application of a high strength adhesive layer 7, which requires a curing step, generally at temperatures less than 400° C.

Figure 2:
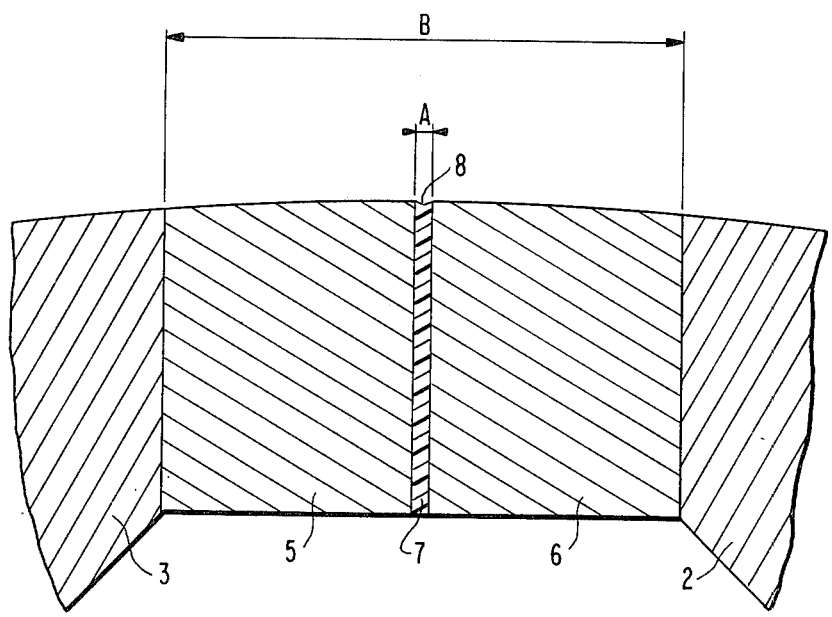
FIG. 2 is a cross sectional view of the pole pieces and gap of the magnetic recording/reproducing head produced by the process of the present invention, illustrating the minimual gap wear caused by recording use.

FIG. 2 represents a view of the assembly 1 of FIG. 1, after actual recording use and shows the minimal wear characteristics encountered by the recording/reproducing heads made in accordance with the present invention. Chrome layers 5, 6 exhibit substantially greater wear resistance than pole pieces 2, 3, and the only area of wear is at area 8 of the exposed portion of the adhesive layer 7. Thus, the wear is basically confined to an area having a width "A", which is a small portion, less than 10%, of the width "B" of the gap.

The eroded area 8 of the assembly of FIG. 2 is insignificant in its effect upon the ultimate use properties of the recording/reproducing head.

EXAMPLE OF THE INVENTION

Manganese zinc ferrite pieces were hot pressed and then formed, lapped and polished into the shape represented by FIG. 2 of my aforesaid pending U.S. patent application Ser. No. 382,604. The resulting half sections were then placed on a water-cooled (approximately 60° F.) cathode in a Model 776 Vecco High Vacuum System. This system was evacuated and then backfilled with argon gas to a pressure of 5M TORR. The surfaces of the ferrite section were cleaned by back sputtering for 10 minutes. After the cleaning step, the power was reversed and chromium was sputtered onto the ferrite sections, using a 4" chromium target piece and a distance of 1½" between cathodes. The R.F. power source had a frequency of 13.5 megacycles per second and was operated at 2000 watts of power. A layer of chromium of about 50 michroinches thick was applied in about one hour of chromium sputtering. The system was then returned to atmospheric pressure and the parts were removed.

The ferrite sections were then adhered into holders, of the type disclosed in FIGS. 3 and 4 of the aforesaid copending patent application Ser. No. 382,604. The epoxy resin was an epichlorohydrin-bisphenol A resin, sold under the designation "EPON 1004." The pole pieces were glass bonded into the holders, and the chromium layers on the pole pieces were bonded together by applying appropriate amounts of the aforesaid epoxy resin, and then holding the assembly at a temperature of 325° F. for one hour. The bonded assemblies were then allowed to cool, and were subjected to the further manufacturing steps described in my aforesaid co-pending patent application Ser. No. 382,604.

I claim:

1. A process for increasing the wear resistance of a magnetic recording/reproducing head, said head comprising a core of magnetic hot-pressed manganese zinc ferrite material having opposed pole faces defining at least one gap therein between, said process comprising first forming a layer of chromium on each of said pole faces by R.F. sputtering the chromium thereon, with the two chromium layers being of a thickness of at least 90% of the width of said gap, and thereafter adhering the resulting chromium layers together by applying a high termperature epoxy adhesive at least 1 microinch thick to the area of the gap between said chromium layers, and curing the epoxy adhesive at a temperature below 400° C. to adhere the chromium layers together by the epoxy adhesive.

2. Process of claim 1, wherein the epoxy adhesive is cured at a temperature of 250°–350° C.

3. Process of claim 1, wherein the width of said gap is about 10 to about 500 microinches.

4. Process of claim 3, wherein each chromium layer has a thickness of about 45 to about 49.9% of the gap thickness.

5. Process according to claim 4, wherein the maximum thickness of said adhesive layer is about 10 microinches.

6. Process of claim 5, wherein each of said chromium layers is of substantially the same thickness.

7. Process of claim 6, wherein the total thickness of said gap is about 40 to about 200 microinches.

* * * * *